United States Patent [19]

Nishida et al.

[11] Patent Number: 4,981,892
[45] Date of Patent: Jan. 1, 1991

[54] METHACRYLAMIDE RESIN COMPOSITION

[75] Inventors: Kozi Nishida; Mikiharu Watanabe, both of Toyama, Japan

[73] Assignee: Mitsubishi Rayon Company, Limited, Tokyo, Japan

[21] Appl. No.: 349,651

[22] Filed: May 10, 1989

[30] Foreign Application Priority Data

May 11, 1988 [JP] Japan .................. 63-114196

[51] Int. Cl.$^5$ ...................... C08K 5/13; C08K 5/10
[52] U.S. Cl. ..................... 524/291; 524/336; 524/337
[58] Field of Search ............. 525/451, 379; 524/291, 524/336, 337; 427/160

[56] References Cited

U.S. PATENT DOCUMENTS

| | | | |
|---|---|---|---|
| 2,146,209 | 2/1939 | Graves | 525/154 |
| 3,206,431 | 9/1965 | Doyle et al. | 524/291 |
| 3,382,183 | 5/1968 | Donoian et al. | 524/337 |
| 4,246,374 | 1/1981 | Kopchik | 525/379 |
| 4,727,117 | 2/1988 | Abberton | 524/343 |
| 4,745,159 | 5/1988 | Anzai et al. | 525/379 |
| 4,816,524 | 3/1989 | Anzai et al. | 525/379 |

*Primary Examiner*—Veronica P. Hoke

*Attorney, Agent, or Firm*—Oblon, Spivak, McClelland, Maier & Neustadt

[57] ABSTRACT

A thermoplastic resin composition comprising 0.01 to 10 parts by weight of at least one ultraviolet ray absorbent having a peak absorption wavelength at 240–300 nm in the range of 240–400 nm and 100 parts by weight of methacrylimide group-containing polymer containing at least 5% by weight of imide ring structural unit expressed by the following structural formula is disclosed:

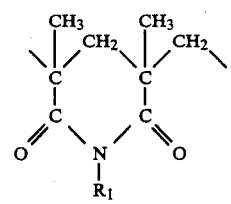

(wherein $R_1$ is a hydrogen atom, or a substituted or non-substituted alkyl group having 1–20 carbon atoms, cycloalkyl group, aryl group, alkalyl group, alalkyl group, or allyl group.)

This composition has an improved weather durability and thermal resistance as well as light transmittance.

3 Claims, No Drawings

METHACRYLAMIDE RESIN COMPOSITION

BACKGROUND OF THE INVENTION

1. Field of the Invention

The present invention relates to a thermoplastic resin composition with excellent properties in heat resistance, transparency and weather durability. More particularly, the present invention concerns a thermoplastic resin composition in which the weather durability of the methacrylimide group-containing polymer is improved.

2. Description of the Prior Art

It is well known that the methacrylimide group-containing polymer is a thermoplastic resin with a high heat distortion or heat resistance temperature and a high degree of transparency (Japanese Patent Publication No. 38404/1985).

However, the methacrylimide group-containing resin polymer is not good enough in weather durability such as resistance to solar rays, wind and rain, and hot and cold, giving rise to deteriorations in transparency and appearance, which are extremely important problems in practical use.

In order to improve the weather durability of such methacrylimide group-containing polymers, an attempt has been made to add thereto a benzotriazole type ultraviolet ray absorbent. However, even this method fails to obtain a methacrylimide group-containing polymer which is comparable to methyl methacrylate resin which is a transparent and has the most excellent weather durability.

As a result of studies for improving the weather durability of the methacrylimide group-containing polymer, it has been found that a methacrylimide group-containing polymer composition with unexpectedly excellent weather durability can be obtained by adding a specific amount of a specific sort of an ultraviolet absorbent to the methacrylimide group-containing polymer.

SUMMARY OF THE INVENTION

The present invention is to provide a thermoplastic resin composition comprising 0.01 to 10 parts by weight of an ultraviolet ray absorbent having a peak absorption wavelength at 240 to 300 nm in the range of 240 to 400 nm and 100 parts by weight of methacrylimide group-containing polymer containing at least 5% by weight of an imide ring structural unit expressed by the structural formula (I)

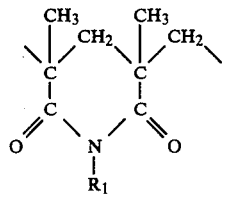

(wherein $R_1$ is a hydrogen atom, or a substituted or non-substituted alkyl group having 1 to 20 carbon atoms, cycloalkyl group, aryl group, alkalyl group or alalkyl group, or an allyl group.)

DESCRIPTION OF THE PREFERRED EMBODIMENTS

As a method for preparing the methacrylimide group-containing polymer in the present invention, it is useful to react a methacrylic resin with ammonia or a primary amines having 1 to 20 carbon atoms (which ammonia and primary amine will hereinafter be referred to as "an imidizing agent") in an inert gas atmosphere and in an inert solvent at a temperature of 180° to 350° C., preferably at a temperature of 200° to 330° C. As the inert gas, nitrogen gas is useful. As the inert solvent, a solvent or a mixture of solvents of two or more kinds which can dissolve the methacrylic resin of the starting material as well as the methacrylimide group-containing polymer of the resulting product is preferable. Examples of the solvents include aromatic hydrocarbons such as toluene and xylene, and aliphatic alcohols such as methanol, ethanol and propanol.

In the imide ring structure mentioned above, $R_1$ is a hydrogen atom, a substituted or non-substituted alkyl group having 1 to 20 carbon atoms, cycloalkyl group, aryl group, alkalyl group, or alalkyl group, or an allyl group. Among these, a hydrogen atom, methyl group, ethyl group, t-butyl group, cyclohexyl group and phenyl group are preferred in practice. For obtaining the imide ring structural unit, ammonia, methylamine, ethylamine, t-butylamine, cyclohexyl amine are useful as the imidizing agent.

Further, the methacrylimide group-containing polymer in the present invention preferably contains at least 5% by weight, more preferably contains more than 20% by weight of the imide ring structural unit. When the content of the imide ring structural unit is less than 5% by weight, the polymer is low in heat resistance temperature.

Examples of the methacrylic polymers or resins useful in the production of the methacrylimide group-containing polymer in the present invention include a homopolymer of methyl methacrylate, and copolymers of methyl methacrylate with other methacrylic acid esters, acrylic acid esters, styrene, α-methylstyrene, acrylonitrile or the like.

Examples of other methacrylic acid esters include ethyl methacrylate, propyl methacrylate, n-butyl methacrylate, isobutyl methacrylate, t-butyl methacrylate, cyclohexyl methacrylate and benzyl methacrylate. Examples of acrylic acid esters include methyl acrylate, ethyl acrylate, propyl acrylate, n-butyl acrylate, isobutyl acrylate, t-butyl acrylate, cyclohexyl acrylate and benzyl acrylate.

As the methacrylic polymer or resin to be used for the production of the methacrylimide group-containing polymer, a homopolymer of methyl methacrylate, a methyl methacrylate-methyl acrylate copolymer or a methyl metacrylate-styrene copolymer is especially preferable. In case of any of these copolymers, while the content of methyl methacrylate is not specifically restricted, it is preferred to be at least 70% by weight.

The ultraviolet ray absorbent to be used in the present invention should have a peak absorption wavelength at 240–300 nm in the range of 240–400 nm. Example of the absorbent include benzophenone compounds, salicylate compounds, and benzoate compounds. Examples of useful benzophenone compounds include 2,4-di-hydroxybenzophenone and 4-n-octyloxy-2-hydroxybenzophenone. Useful salicylate compounds include p-t-butyl-phenylsalicycate. Further, useful benzoate compounds include 2,4-di-t-butylphenyl-3',5'-di-t-butyl-4'-hydroxybenzoate.

With 100 parts by weight of the methacrylimide group-containing resin polymer, the ultraviolet ray absorbent is blended in an amount more than 0.01 part by weight and less than 10 parts by weight, more preferably in an amount more than 0.05 parts by weight and less than 3 parts by weight. If blended less than 0.01 part by weight, its contribution to the improvement of weather durability is insufficient, and, if blended in excess of 10 parts by weight, it invites undesirable degradations in mechanical strength of the polymer. As a method for adding the ultraviolet absorbent used in the present invention, while a method of adding it to the methacrylimide group-containing resin polymer by the use of an extruder;

a method of adding same in the stage of the reaction for forming the imide ring structure expressed by Formula (I);

a method of adding the absorbent in the process of producing the methacrylic resin to be used as a starting material for the methacrylimide group-containing polymer, more particularly, in the process of polymerization by dissolving the absorbent in the monomer prior to polymerization; and a method of adding the absorbent after the polymerization can be mentioned, a method of adding the absorbent to the methacrylimide group-containing polymer by the use of an extruder is substantially simple and easy to handle.

The resin composition of the present invention does not prohibit concurrent use of other ultraviolet ray absorbers, for example, triazole type absorbent, tetramethyl-piperidine type photostabilizer, a thermal stabilizer, for example, of hindered phenol type or phosphite type.

If necessary, a lubricant, plasticizer, coloring agent, flame retardant, foaming agent, pigment, delustering agent, lubricant, antistatic agent, glass or other fiber, talc, or other additives may be added to the composition. Further, it is also possible to blend at least another thermoplastic resin. Such resin includes methyl methacrylate polymer, ABS resin, MBS resin, AS resin, polycarbonate, polybutylene terephthalate, polyethylene terephthalate, polyvinyl chloride, chlorinated polyvinyl chloride, polyarylate, polystyrene, high-impact polystyrene, styrene-maleic anhydride copolymer, styrene-maleimide copolymer, polyolefin, acid-modified polyolefin, glycidyl-modified polyolefin, polyether ester, polyether ester amide, polyether amide, polyphenylene sulfide, polyphenyleneoxide, polysulfone, polyphenyleneoxide-styrene resin blend polymer, polyether ether-ketone, polyetherimide, thermoplastic polyimide.

EXAMPLES

The present invention will now be described in more detail with reference to Examples, but the present invention is not limited to them.

In the following Examples and Referential Examples, the term "part" means "part by weight" unless indicated otherwise.

In these Examples, the properties of polymers or the resin compositions were measured by the following methods.

(1) Infrared absorption spectrum was measured by the KBr disc method using an infrared spectrophotometer (Type 285 of Hitachi Ltd.)

(2) Intrinsic viscosity of the polymer was determined by measuring the flow time (ts) of a sample polymer solution in chloroform in a concentration of 0.5% by weight and the flow time (to) of chloroform with use of a Deereax-Bishcff viscometer at a temperature of 25° C. ±0.1° C. to obtain the relative viscosity $\eta rel$ of the polymer from ts/to, calculating the intrinsic viscosity according to the following formula Intrinsic viscosity = $(\ln \eta rel)/C$ (dl/g)

(where C is the weight in gram of the polymer in 100 ml of the solvent.)

(3) Heat distortion temperature was measured according to ASTM D648.

(4) Melt index of the polymer was determined according to ASTM D1238 (weight in gram in 10 minutes with application of load of 10 kg at 260° C.).

(5) Imide conversion rate (%) in the polymer was measured on the basis of the nitrogen content indicated by the value in elementary analysis (by CHN Corder (MT-3), a product of Yanagimoto Seisakusho K.K.) and proton NMR JNM-FX-100 (JOEL) spectrometer 100 MHz.

(6) Assessment of transparency: The resin composition was molded into a 3.2 mm thick plate to assess its transparency in terms of the total light transmittance according to ASTM D1003.

(7) Assessment of weather durability: Weather durability was assessed by artificially accelerated exposure using Sunshine Carbon Weather Meter WEL-SUN-HC, a product of SUGA Shikenki K.K. (for 18 minutes in 120 minutes spraying with black panel temperature at 63° C.). In the assessment of weather durability, the appearance was examined by both eye and microscopic observation in addition to the transparency.

(8) Measurement of peak absorption wavelength of the ultraviolet ray absorbent in the range of 240 to 400 nm: Each one of various ultraviolet ray absorbents were dissolved in 100 g of methylene chloride in an amount of 0.001 to 0.005 g, and then the solution was put in a 1 cm long quartz cell to measure the peak absorption wavelength in the range of 240 to 400 nm by the use of a self-analyzing spectrophotometer U-3400 (a product of Hitachi Seisakusho).

Preparation of Methacrylimide Group-containing Polymers (A-1 to A-4)

A mixture of 100 parts of sufficiently dried methylmethacrylate polymer (Acrypet ®VH, a product of Mitsubishi Rayon Co., Ltd. with an intrinsic viscosity of 0.51), 90 parts of toluene and 10 parts of methanol was put in a reactor of 10 liters equipped with a paddle spiral stirrer, pressure gauge, sample injecting vessel and jacket heater, and, after sufficient replacement by nitrogen, the mixture was heated with stirring to dissolve the polymer. Next, a methanol solution dissolving 24.8 g of methylamine (0.8 in molar ratio) was added through the sample injecting vessel and heated to 230° C. with stirring. Reaction was carried out for 3 hours under an internal pressure of 55 kg/cm² (gauze pressure). Upon completion of the reaction, the methacrylimide group-containing polymer solution was taken out, and stripped of the solvent and dried in a vacuum drier at 100° C., obtaining a porous polymer. The infrared spectrophotometric examination of the obtained polymer (A-1) showed absorptions at 1720 cm$^{-1}$, 1663 cm$^{-1}$ and 750 cm$^{-1}$ which are inherent to methacrylimide, and thus it was identified as polyglutarimide. The imide conversion rate was 100%, and the heat distortion temperature was 182° C. Table 1 shows the test results of methacrylimide group-containing polymers which were prepared in the same manner except that the imide conversion rate was changed to vary the heat distortion temperature. Also shown in Table 1 are the values of melt index of the polymers with different imide conversion rates.

TABLE 1

| | Methacrylimide Group-Containing Polymer | | |
|---|---|---|---|
| | Imide Conversion (%) | Heat Distortion Temp. (°C.) | Melt Index |
| A-1 | 100 | 182 | 3.5 |
| A-2 | 70 | 159 | 6.0 |
| A-3 | 50 | 150 | 13.2 |
| A-4 | 30 | 132 | 25.0 |

The term "imide conversion rate" stands for the value of x in the assumedly repetitive structure of the methacrylimide group-containing polymers consisting of a methacrylimide ring structural units and methylmethacrylate units expressed by the general formula (II).

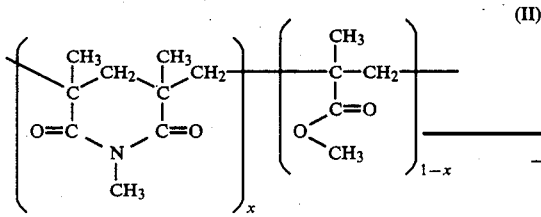

The value x was determined on the basis of the nitrogen content determined by elementary analysis and the integrated ratio of the methyl absorption due to N—CH$_3$ and the methyl absorption due to (O—CH$_3$) in proton NMR.

EXAMPLES 1 TO 4

Added to 100 parts of each of the methacrylimide group-containing polymers A-1 to A-4 mentioned above were 0.2 parts of 2,4-di-t-butylphenyl-3',5'-di-t-butyl-4'-hydroxybenzoate ("Viosorb 80" (trade name), a product of Kyodoh Yakuhin K.K., having a peak absorption wavelength at 265 nm, and the resulting mixture (resin composition) was put in a V-type blender and mixed for 5 minutes. The mixture of each polymer was formed into pellets by means of a 40 mm diameter bent type extruder with a cylinder temperature of 230° C. to 300° C., obtaining four different kinds of thermoplastic resin compositions. Next, these pellets were formed into 3.2 mm thick plates of 100 mm×100 mm dimensions and dumbbell type test pieces prescribed in JIS K6871 by the use of a 5 oz. injection molding machine. These plates and dumbbell type test pieces were subjected to artificially accelerated exposure for assessment of weather durability.

The total light transmittance of the plates were measured before and after the accelerated exposure according to ASTM D1003 for assessment of weather durability with respect to the appearance of the molded products, and changes in color were assessed by eye observation. The weather durability with respect to the physical properties was assessed by measuring the tensile strength of the dumbbell type test pieces by the method of JIS K6871 before and after the exposure. The results of these tests are shown in Table 2.

REFERENTIAL EXAMPLES 1 TO 4

Plates and dumbbell type test pieces were prepared from the same methacrylimide group-containing polymers as A-1 to A-4 in the same manner as in Examples 1 to 4 except for the omission of the "Viosorb 80", and their various properties were assessed by the same methods. The results of these assessments are also shown in Table 2.

TABLE 2

| | Before Exposure | | | After 1000 hrs. Exposure | | |
|---|---|---|---|---|---|---|
| | Total Light Transmittance (%) | Appearance (Surface) | Tensile Strength (kg/cm2) | Total Light Transmittance (%) | Appearance (Surface) | Tensile Strength (kg/cm2) |
| Ex. 1 | 91 | Good | 850 | 77 | Good | 840 |
| Ex. 2 | 91 | " | 830 | 80 | " | 820 |
| Ex. 3 | 91 | " | 800 | 80 | " | 790 |
| Ex. 4 | 91 | " | 770 | 83 | " | 760 |
| Ref. EX. 1 | 91 | " | 850 | 35 | Whitened & Cracked | 650 |
| Ref. Ex. 2 | 91 | " | 830 | 42 | Whitened & Cracked | 630 |
| Ref. Ex. 3 | 91 | " | 800 | 45 | Whitened & Cracked | 630 |
| Ref. Ex. 4 | 91 | " | 770 | 47 | Whitened & Cracked | 630 |

EXAMPLE 5

Added to 100 parts of the methacrylimide group-containing resin polymer A-2 were 0.2 parts of butyl palmitate (a plasticizer), 0.2 parts of octadecyl-3-(3,5-di-tert-butyl-4-hydroxyphenyl) propyonate (a thermal stabilizer "Irgafox 1076" (trade name) of Chiba Geigy Co., Ltd.) and 0.05 parts of tris (2,4-di-tert-butylphenyl) phosphite (a thermal stabilizer "Irgafox 168" (trade name) of Chiba Geigy Co., Ltd.), and thereafter further added thereto were 0.2 parts of bis(2,2,6,6-tetramethyl-4-piperidyl) sebacate (a piperidine derivative, "Sanol LS-770" (trade name) of Sankyo Co., Ltd.) and 0.2 parts of the "Viosorb 80", forming plate moldings and dumbbell type test pieces by the same method as in Example 1 for assessment of various physical properties. The results are shown in Table 3.

EXAMPLE 6

Example 5 was repeated except that 2,4-di-hydroxybenzophenone ("Viosorb 100" (trade name), a product of Kyodoh Yakuhin K.K., having a peak absorption wavelength at 290 nm) was used as a benzophenone-compound in place of the "Viosorb 80", making plate moldings and dumbbell type test pieces in the same manner as in Example 5 for assessment of various physical properties. The results are shown in Table 3.

EXAMPLE 7

Example 5 was repeated except that 4-n-octyloxy-2-hydroxybenzophenone ("Mark 1413" (trade name)), a product of Adeca Argus K.K., having a peak absorption wavelength at 290 nm was used as a benzophenone compound in place of the "Viosorb 80", making plate moldings and dumbbell type test pieces in the same manner as in Example 5 for assessment of various physical properties. The results are shown in Table 3.

EXAMPLE 8

Example 5 was repeated except that p-t-butylphenyl-salicylate ("Viosorb 90" (trade name), a product of Kyodoh Yakuhin K.K., having a peak absorption wavelength at 245 nm) was used as a salicylate-compound in place of the "Viosorb 80", making plate moldings and dumbbell type test pieces in the same manner as in Example 5 for assessment of various physical properties. The results are shown in Table 3.

REFERENTIAL EXAMPLE 5

Example 5 was repeated except for emission of the "Viosorb 80", to prepare plate moldings and dumbbell type test pieces in the same manner as in Example 5 for assessment of various physical properties. The results are shown in Table 3.

octyloxy-2-hydroxybenzophenone, 2,4-dihydroxybenzophenone, p-t-butyl-phenylsalicylate and 2,4-di-t-butylphenyl-3',5',-di-t-butyl-4'-hydroxybenzoate, and 100 parts by weight of a methacrylimide group-containing polymer containing at least 5% by weight of imide ring structural unit expressed by the structural formula (I)

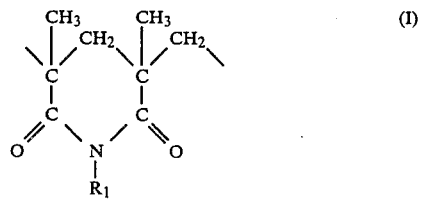

wherein $R_1$ is a hydrogen atom, substituted or non-substituted alkyl group having 1–20 carbon atoms, cycloalkyl group, aryl group, alkalyl group, alalkyl group, or allyl group.

2. A thermoplastic resin composition as claimed in claim 1, wherein the ultraviolet ray absorber is 4-n-octyloxy-2-hydroxybenzophenone.

3. A thermoplastic resin composition as claimed in claim 1, wherein the composition additionally contains at least one resin selected from the group consisting of methacrylic resin, acrylonitrile-butadiene-styrene resin, methacrylate-butadiene-styrene resin, acrylonitrile-styrene resin polycarbonate, polybutylene terephthalate, polyethylene terephthalate, polyvinyl chloride, polystyrene, polyolefin and polyamide.

TABLE 3

|  | Before Exposure ||| After 1000 hrs. Exposure |||
| --- | --- | --- | --- | --- | --- | --- |
|  | Total Light Transmittance (%) | Appearance (Surface) | Tensile Strength (kg/cm2) | Total Light Transmittance (%) | Appearance (Surface) | Tensile Strength (kg/cm2) |
| Ex. 5 | 91 | Good | 830 | 85 | Good | 825 |
| Ex. 6 | 91 | " | 830 | 83 | " | 820 |
| Ex. 7 | 91 | " | 830 | 83 | " | 820 |
| Ex. 8 | 91 | " | 830 | 81 | " | 820 |
| Ref. EX. 5 | 91 | " | 830 | 54 | Whitened & Cracked | 660 |

We claim:

1. A thermoplastic resin composition comprising 0.01 to 10 parts by weight of at least one ultraviolet ray absorber selected from the group consisting of 4-n-